April 15, 1930. C. S. POPE 1,754,523
SELF GRINDING VALVE
Filed July 14, 1928
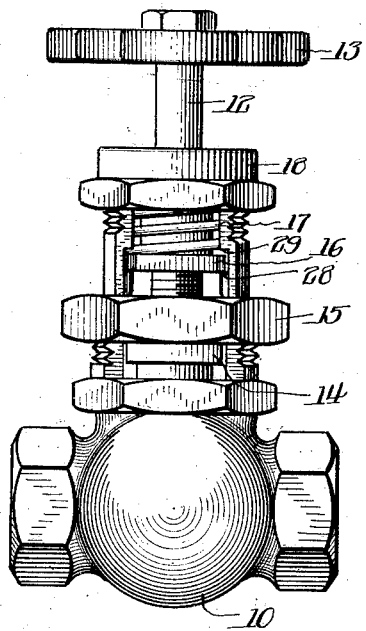
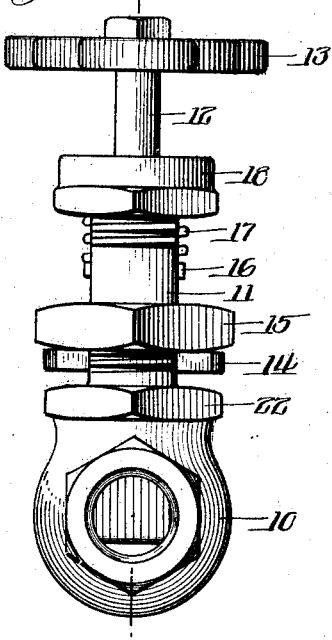
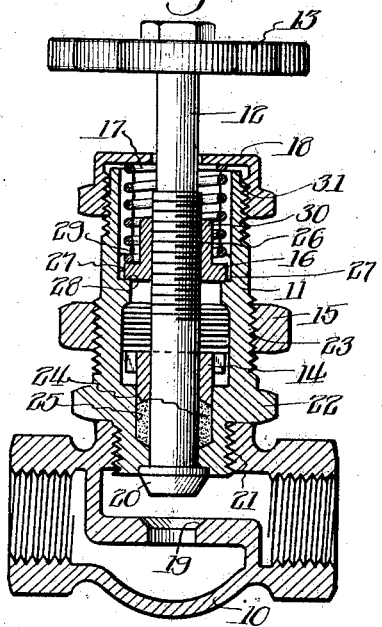
Inventor:
Charles S. Pope,
By Cromwell, Greist & Warden
Attys.

Patented Apr. 15, 1930

1,754,523

UNITED STATES PATENT OFFICE

CHARLES S. POPE, OF CHICAGO, ILLINOIS, ASSIGNOR TO CENTRAL VALVE MFG. CO., OF CHICAGO, ILLINOIS, A CORPORATION OF DELAWARE

SELF-GRINDING VALVE

Application filed July 14, 1928. Serial No. 292,633.

The principal object of the invention is to provide a self-grinding valve of improved construction, arrangement and operation.

In a valve constructed in accordance with the invention, there is no danger of the bonnet coming off accidentally when the valve is opened, the stem can be repacked without removing the bonnet, and the pressure placed upon the head by the spring in the grinding operation can be varied to suit the conditions under which the valve is used.

Other objects and advantages of the invention will be apparent to those skilled in the art upon a full understanding of the novel features of the valve.

One form of the invention is presented herein for the purpose of exemplification, but it will of course be appreciated that the invention is susceptible of embodiment in other structurally modified forms coming equally within the scope of the appended claim.

In the accompanying drawing:

Fig. 1 is a side view of a valve embodying the invention;

Fig. 2 is an end view; and

Fig. 3 is a vertical section, taken on the line 3—3 of Fig. 2.

The valve shown in the drawing includes a body 10, a bonnet 11, a stem 12, a handle 13, a packing gland 14, a packing nut 15, a spring block 16, a spring 17, and a spring-retaining cap 18.

The body 10 is provided with a seat 19 for coaction with a head 20 on the lower end of the stem 12. The bonnet 11 is screwed into the body 10 at 21 and is provided adjacent its lower end with a hexagonal wrench-engaging portion 22 by means of which the screwing action may be effected. Above the portion 22 the bonnet is provided with openings in opposite sides of the same through which the sides of the gland 14 and block 16 extend.

The packing nut 15 is in screw-threaded engagement with the bonnet at 23 and, when the nut is screwed down, it forces the packing gland 14 downwardly to compress some packing 24 which occupies a well 25 between the bonnet and the stem. The spring block 16 is in screw-threaded engagement with the stem at 26, and is held against rotation in the bonnet by engagement with the sides 27 of the latter. The block is limited in its downward movement by shoudlers 28 in the bonnet, and is limited in its upward movement by shoulders 29. The spring 17 surrounds an upwardly extending sleeve 30 on the block and is pressed downwardly against the block by means of the retaining cap 18, which cap is screwed down onto the upper end of the bonnet at 31.

The operation of the valve is as follows:

Starting with the valve in the open position shown in Fig. 3—in which position the upper face of the head 20 is drawn up snugly against the lower face of the bonnet—the valve is closed and ground by rotating the handle 13 in a clockwise direction. When the handle is rotated, the stem 12 screws down through the block 16, which is held against the shoulders 28 in the bonnet by the action of the spring 17. When the head 20 comes into engagement with the seat 19, continued rotary movement of the handle 13 in a clockwise direction causes the block 16 to move upwardly toward the shoulders 29 in the bonnet against the action of the spring 17, and the head 20 is held against the seat 19 during such movement by the pressure of the spring. When the upper surface of the spring block 16 engages with the shoulders 29, further, upward movement of the spring block is prevented and the head 20 is held unyieldingly against the seat 19. Any foreign matter on the seat at the commencement of the grinding operation is pulverized, and a fluid-tight seating is insured. When the valve is to be opened, the handle 13 is rotated in a counterclockwise direction, and the grinding operation again occurs during the movement of the spring block 16 from the shoulders 29 to the shoulders 28.

The packing 25 in the valve may be easily replaced without shutting off the line in which the valve is located. To replace the packing, it is merely necessary to fully open or fully close the valve, unscrew the nut 15, and lift the gland 14.

Inasmuch as the bonnet 11 does not have to be disturbed in re-packing the valve, it may be permanently screwed into the body, thereby obviating any danger of the bonnet being accidentally unscrewed from the body when the handle 13 is turned in a counterclockwise direction to open the valve.

The pressure required to effect the grinding operation depends upon the nature of the foreign matter present in the fluid with which the valve is used. In some cases an extremely heavy grinding pressure is necessary, while in others a light pressure will suffice. The grinding pressure is regulated by the compression of the spring 17, and the spring-retaining cap 18 is made vertically adjustable with respect to the bonnet by reason of the screw-threaded engagement therewith, whereby to permit such pressure to be easily regulated.

The arrangement of the spring-retaining cap 18 in a readily removable position, permits replacement of the spring while the valve is in use.

I claim:

In a self-grinding valve, a body, a bonnet secured to the top of the body, a threaded stem extending down through the bonnet into the body, a block mounted non-rotatably between stops in the bonnet in screw-threaded engagement with the stem, a compressed spring above the block, a packing between the stem and the bonnet, a packing gland on the stem below the block, and a nut screwed onto the bonnet against the gland for compressing the packing.

In testimony whereof I have hereunto subscribed my name.

CHARLES S. POPE.